Aug. 25, 1959   W. C. HANSEN   2,901,070
CAM ACTUATED CLUTCH
Filed April 25, 1957

Woodrow C. Hansen
INVENTOR.

BY Clarence A. O'Brien
and Harvey B. Jacobson
Attorneys

United States Patent Office 2,901,070
Patented Aug. 25, 1959

2,901,070

CAM ACTUATED CLUTCH

Woodrow C. Hansen, Mount Shasta, Calif.

Application April 25, 1957, Serial No. 655,091

6 Claims. (Cl. 192—34)

This invention relates in general to new and useful improvements in clutch assemblies, and more specifically to a cam actuated clutch assembly for connecting in driving relation a pair of aligned shafts in response to relative longitudinal movement between the shafts.

The primary object of this invention is to provide an improved clutch which may be utilized in conjunction with a power tool, such as a power drill for the purpose of connecting the usual power shaft of the power drill with the truck thereof to drive the truck only when there is an endwise pressure thereon.

Another object of this invention is to provide an improved clutch assembly which includes a pair of aligned shafts, one of the shafts having connected thereto a housing and the other of the shafts having connected thereto a crank, there being disposed within the housing a pair of clutch members and the crank having cam surfaces disposed between the clutch members for urging the clutch members apart and into frictional engagement with the housing in response to longitudinal movement of one of the shafts relative to the other.

A further object of this invention is to provide an improved clutch assembly for use in connection with power tools, the clutch assembly including first and second shafts which are aligned, the shafts being normally disengaged from each other and being connected together by clutch elements, the clutch elements being actuated in response to relative longitudinal movements of the shafts with respect to each other to interlock the shafts in driving relation.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
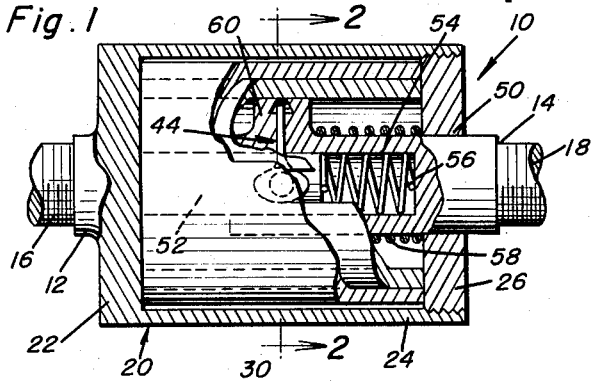
Figure 1 is a longitudinal sectional view taken through a first form of cam actuated clutch and shows generally the details thereof.
Figure 2:
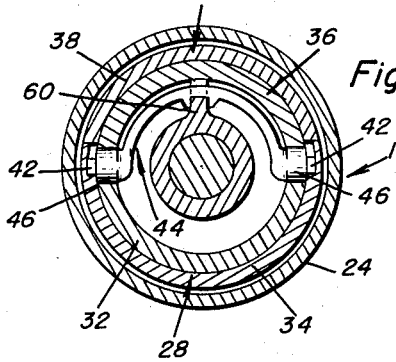
Figure 2 is a transverse vertical sectional view taken substantially upon the plane indicated by the section line 2—2 of Figure 1 and shows further the details of the cam actuated clutch.
Figure 3:
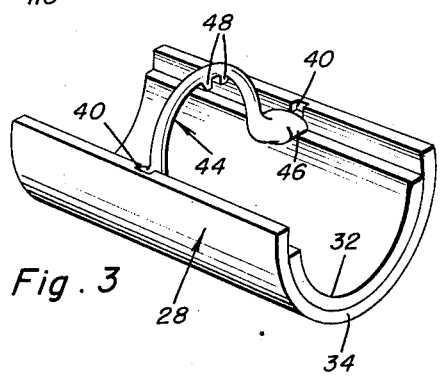
Figure 3 is a perspective view of one of the clutch members of the cam actuated clutch and the crank for actuating the cam actuating clutch.

Referring now to the drawings in detail, it will be seen that there is illustrated in Figures 1, 2 and 3, a first form of cam actuated clutch which is referred to in general by the reference numeral 10. The cam actuated clutch 10 includes a first shaft 12 and a second shaft 14. The shafts 12 and 14 are longitudinally aligned and are provided with threaded portions 16 and 18, respectively, for the connection thereof to suitable elements of tools.

Carried by the shaft 12 is a housing which is referred to in general by the reference numeral 20. The housing 20 includes an end wall 22 to which the shaft 12 is rigidly secured. The housing 20 also includes a cylindrical body portion 24 which is carried by the end wall 22. The opposite end of the housing 20 is closed by an end wall 26 threadedly engaged in the body portion 24.

Positioned within the body portion 24, as is best illustrated in Figure 2, is a pair of clutch members 28 and 30. The clutch member 28 includes a metal backing 32 and a clutch shoe 34. The clutch shoe 34 is of a diameter slightly less than the diameter of the internal diameter of the body portion 24. The backing 32 terminates short of the free edges of the clutch shoe 34.

The clutch member 30 is similar to the clutch member 28 in that it includes a metal backing 36 and a clutch shoe 38. The clutch shoes 34 and 38 normally have edges thereof in opposed engaged positions. The backings 32 and 36 have opposed edges which are disposed in spaced relation.

The clutch shoe 34 is provided in the central part thereof with diametrically opposite slots 40. Positioned in the slots 40 are journal portions 42 and a crank 44. The crank 44 also includes cam portions 46 which are disposed between the metal backings 32 and 36. It will be noted that the journal portions 42 are carried by the cam portions 46. The central part of the crank 44 includes a pair of guides 48.

The shaft 14 is rotatably journaled in a bore 50 formed in the end wall 26. Further, the wall 22 is provided with a shaft extension 52 which is rotatably journaled in a bore 54 formed in an end portion of the shaft 14 which is disposed within the housing 20. The shaft 14 is centered with respect to the housing 20 by means of a coil spring 56 which is disposed within the bore 54 and opposes the end of the shaft 52. A second coil spring 14 is carried by shaft 52 and urges the shaft 14 in the opposite direction.

That portion of the shaft 14 which is disposed within the housing 20 includes a projecting lug 60 which in turn carries the crank 44. When the shaft 14 is in its neutral position, as is illustrated in Figure 1, the crank 44 is also in a neutral position. However, when the shafts 12 and 14 are shifted longitudinally with respect to each other, the crank 44 is rocked with the result that the cam portions 46 urge the clutch members 28 and 30 apart so that the clutch shoes 34 and 38 frictionally engage the body portion 24 so as to lock the shafts 12 and 14 in driving relation.

Figure 4:
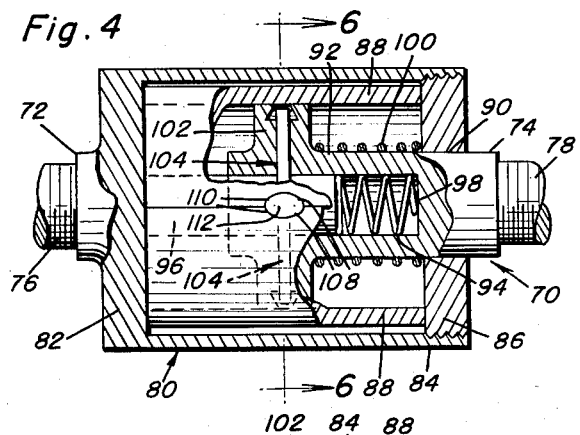
Figure 4 is a longitudinal sectional view of a modified form of cam actuated clutch.
Figure 6:
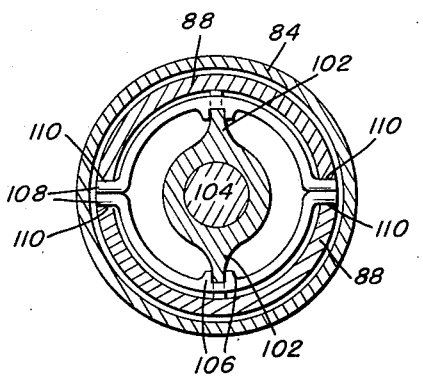
Figure 6 is a transverse sectional view taken substantially upon the plane indicated by the section line 6—6 of Figure 4 and shows further the details of the clutch.
Figure 5:
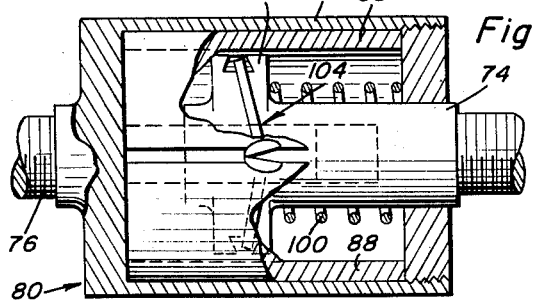
Figure 5 is a view similar to Figure 4 and shows the cam actuated clutch in an operative position.

Referring now to Figures 4, 5 and 6 in particular, it will be seen that there is illustrated a second form of cam actuated clutch which is referred to in general by the reference numeral 70. The cam operated clutch 70 includes a pair of aligned shafts 72 and 74. The shafts 72 and 74 include threaded portions 76 and 78, respectively, to facilitate their coupling to parts of a tool.

Carried by the shaft 72 is a housing 80. The housing 80 includes an end wall 82 which is rigidly secured to the shaft 72. The housing 80 also includes a cylindrical body portion 84 which is rigidly secured to the end wall 82. The end of the body portion 84 remote from the end wall 82 is closed by an end wall 86 which is threadedly engaged in the body portion 84.

Disposed within the housing 80 is a pair of clutch members 88. The clutch members 88 are of a size to be normally spaced from the body portion 84, as is best shown in Figures 4 and 6. When the clutch members are in their inoperative positions, their edges are in opposed touching relation.

The end wall 86 is provided with a bore 90 in which the shaft 14 is journaled. The shaft 14 also includes an end portion 92 which is disposed within the housing 80. The end portion 92 is provided with a longitudinal bore 94 in which there is journaled a shaft 96 carried by the end wall 82.

The shaft 14 is retained in a neutral position by a coil spring 98 disposed within the bore 94 and bearing against an end of the shaft 96. A second coil spring 100 is carried by the shaft 24 and urges the shaft 74 in the opposite direction.

The end portion 92 of the shaft 74 is provided with a pair of diametrically opposite outwardly projecting lugs 102. Carried by each of the lugs 102 is a crank 104 which are retained on the lugs 102 by ears 106, best illustrated in Figure 4. The cranks 104 are identical and each crank 104 includes a pair of cam portions 108. The clutch members 88 are provided with central recesses 110 in which their respective cam portions 108 are normally seated. The cam portions 108 have flat opposed surfaces 112.

From the foregoing description of the cam actuated clutch 70, it will be readily apparent that when the shaft 74 shifts longitudinally with respect to the shaft 72 in the housing 80, the cranks 104 will be actuated so as to pivot the cam portions 108 on each other, as is best shown in Figure 5. This will result in the outward movement of the clutch members 88 into frictional engagement with the body portions 84 and thus lock the shafts 72 and 74 together.

Figure 7:
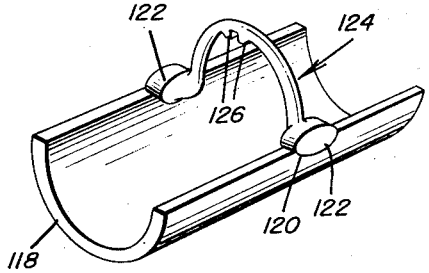
Figure 7 is a perspective view of a modified form of clutch member and a crank for actuating the clutch member.

Referring now to Figure 7, it will be seen that there is illustrated a modified component of a cam actuated clutch, such as the cam actuated clutch 70. In this form of the invention there is provided a pair of clutch members 118 which are identical to the clutch members 88, only one of the clutch members 118 being shown. The clutch members 120 will be provided with centrally located diametrically opposite recesses 120. Seated in the recesses 120 are cam portions 122 of a crank 124. The central part of the crank 124 is provided with ears 126 to facilitate the engagement thereof with lugs such as the lug 60 and the lug 102.

From the foregoing description of the crank 124 and the clutch member 118, it will be readily apparent that when the cam 124 is disposed between a pair of the clutch members 118 and the crank 124 is rotated, the cam portions 122 will urge the clutch members 118 apart and into engagement with a housing, such as the housings 20 and 80.

From the foregoing, it will be readily apparent that there has been devised a plurality of cam actuated clutches which are of such a nature whereby when they are coupled in shafts or between a shaft and a tool receiving member, when there is a relative movement between the shafts, the clutches will be engaged so as to drive a tool or other similar device.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A pressure responsive cam actuated clutch assembly comprising a pair of aligned shafts, a housing secured to one of said shafts for rotation therewith, a pair of oppositely facing clutch members mounted within said housing for frictional engagement therewith, the other of said shafts having an end portion projecting into and journaled in said housing, a transversely disposed crank, said crank having aligned end portions rotatably journalled in at least one of said clutch members, said crank including cam portions disposed between said clutch members for urging said clutch members apart, said crank having an offset central portion connected to said shaft end portion whereby said crank is pivoted in response to longitudinal shifting of said shafts relative to each other to move said clutch members apart.

2. A pressure responsive cam actuated clutch assembly comprising a pair of aligned shafts, a housing secured to one of said shafts for rotation therewith, a pair of oppositely facing clutch members mounted within said housing for frictional engagement therewith, the other of said shafts having an end portion projecting into and journaled in said housing, a transversely disposed crank, said crank having aligned end portions rotatably journalled in at least one of said clutch members, said crank including cam portions disposed between said clutch members for urging said clutch members apart, said crank having an offset central portion connected to said shaft end portion whereby said crank is pivoted in response to longitudinal shifting of said shaft relative to each other to move said clutch members apart, spring means within said housing acting on said shafts and normally retaining said crank in a neutral position.

3. A pressure responsive cam actuated clutch assembly comprising a pair of aligned shafts, a housing secured to one of said shafts for rotation therewith, a pair of oppositely facing clutch members mounted within said housing for frictional engagement therewith, the other of said shafts having an end portion projecting into and journaled in said housing, a transversely disposed crank, said crank having aligned end portions rotatably journaled in at least one of said clutch members, said crank including cam portions disposed between said clutch members for urging said clutch members apart, said crank having an offset central portion connected to said shaft end portion whereby said crank is pivoted in response to longitudinal shifting of said shafts relative to each other to move said clutch members apart, said clutch members each including a metal backing and a clutch shoe on said metal backing, said metal backings being spaced apart with said cam portions disposed between said metal backings.

4. A pressure responsive cam actuated clutch assembly comprising a pair of aligned shafts, a housing secured to one of said shafts for rotation therewith, a pair of oppositely facing clutch members mounted within said housing for frictional engagement therewith, the other of said shafts having an end portion projecting into and journaled in said housing, a crank carried by said end portion, said crank including cam portions disposed between said clutch members for urging said clutch members apart in response to longitudinal shifting of said shafts relative to each other, said clutch members each including a metal backing and a clutch shoe on said metal backing, said metal backings being spaced apart with said cam portions disposed between said metal backings, said crank including journals on said cam portions, said journals being positioned in one of said clutch shoes.

5. A pressure responsive cam actuated clutch assembly comprising a pair of aligned shafts, a housing secured to one of said shafts for rotation therewith, a pair of oppositely facing clutch members mounted within said housing for frictional engagement therewith, the other of said shafts having an end portion projecting into and journaled in said housing, a pair of transversely disposed cranks, each of said cranks having aligned end portions rotatably journaled in one of said clutch members and an offset central portion connected to said shaft end portion, each of said cranks including a pair of cam portions, said cam portions being disposed in opposed relation and between said clutch members for urging said clutch members apart in response to longitudinal shifting of said shafts relative to each other.

6. A pressure responsive cam actuated clutch assembly comprising a pair of aligned shafts, a housing secured to one of said shafts for rotation therewith, a pair of oppositely facing clutch members mounted within said housing for frictional engagement therewith, the other of said shafts having an end portion projecting into said housing, cam elements disposed between said clutch members for urging said clutch members apart, said cam elements having portions rotatably journaled in one of said clutch members, and means extending between said cam elements and said other shaft for rocking said cam elements in response to longitudinal shifting of said shafts relative to each other to engage and disengage said clutch members relative to said housing.

References Cited in the file of this patent
UNITED STATES PATENTS

| | | |
|---|---|---|
| 923,965 | Gether | June 8, 1909 |
| 946,123 | Geisenhoner | Jan. 11, 1910 |
| 970,459 | Bledsoe | Sept. 20, 1910 |
| 2,466,372 | Byrd | Apr. 5, 1949 |